US012237608B2

(12) United States Patent
Farrell et al.

(10) Patent No.: US 12,237,608 B2
(45) Date of Patent: Feb. 25, 2025

(54) ELECTRICAL CONNECTOR ASSEMBLY WITH FLEXIBLE AND RIGID TERMINAL LOCKING FEATURES

(71) Applicant: Aptiv Technologies AG, Schaffhausen (CH)

(72) Inventors: Jack Farrell, Streetsboro, OH (US); Siddhan Manickam, Salem (IN); Dinesh Kumar Manoharan, Chennai (IN)

(73) Assignee: Aptiv Technologies AG, Schaffhausen (CH)

( * ) Notice: Subject to any disclaimer, the term of this patent is extended or adjusted under 35 U.S.C. 154(b) by 345 days.

(21) Appl. No.: 17/896,344

(22) Filed: Aug. 26, 2022

(65) Prior Publication Data

US 2023/0411892 A1 Dec. 21, 2023

Related U.S. Application Data

(60) Provisional application No. 63/353,959, filed on Jun. 21, 2022.

(51) Int. Cl.
*H01R 13/424* (2006.01)
*H01R 13/52* (2006.01)
*H01R 43/20* (2006.01)

(52) U.S. Cl.
CPC ....... *H01R 13/424* (2013.01); *H01R 13/5202* (2013.01); *H01R 43/20* (2013.01)

(58) Field of Classification Search
CPC .......................... H01R 13/424; H01R 13/5202
See application file for complete search history.

(56) References Cited

U.S. PATENT DOCUMENTS 4,973,268 A * 11/1990 Smith .................. H01R 13/443 439/948
5,116,236 A * 5/1992 Colleran ............ H01R 13/4362 439/271
5,439,397 A * 8/1995 Yamanashi ........ H01R 13/4368 439/752

(Continued)

OTHER PUBLICATIONS

"Extended European Search Report"; European Patent Office; Mailed on Nov. 8, 2023, 13 Pages.

*Primary Examiner* — Tulsidas C Patel
*Assistant Examiner* — Carlos E Lopez-Pagan
(74) *Attorney, Agent, or Firm* — Billion & Armitage

(57) ABSTRACT

An electrical connector assembly includes an electrical terminal defining a pair of retaining ridges, a connector housing having a terminal cavity extending therethrough from a first opening to a second opening and a fixed terminal lock nib that projects inwardly into the terminal cavity from a rigid first wall to engage a first ridge of the pair of retaining ridges of the electrical terminal, and a terminal retainer inserted within the connector housing proximate the first opening and removably retained to the connector housing by a flexible retaining arm. The terminal retainer further includes a flexible terminal lock arm having a moveable terminal lock nib that projects inwardly into the terminal cavity from the flexible terminal lock arm to engage a second ridge of the pair of retaining ridges of the electrical terminal, thereby inhibiting removal of the electrical terminal from the terminal cavity through the second opening.

17 Claims, 10 Drawing Sheets

(56) References Cited

U.S. PATENT DOCUMENTS

| | | | | |
|---|---|---|---|---|
| 5,820,411 | A | 10/1998 | Okabe | |
| 5,964,621 | A * | 10/1999 | Wolla | H01R 13/4364<br>439/744 |
| 6,036,521 | A * | 3/2000 | Tabor | H01R 13/5221<br>439/272 |
| 7,396,255 | B2 | 7/2008 | Morello et al. | |
| 9,071,016 | B2 * | 6/2015 | Morello | H01R 13/422 |
| 2002/0076995 | A1 | 6/2002 | Kurimoto et al. | |
| 2004/0192108 | A1 | 9/2004 | Ward et al. | |
| 2006/0292928 | A1 | 12/2006 | Morello et al. | |
| 2011/0256751 | A1 | 10/2011 | Sakamoto | |
| 2014/0335717 | A1 | 11/2014 | Finzer | |

* cited by examiner

ELECTRICAL CONNECTOR ASSEMBLY WITH FLEXIBLE AND RIGID TERMINAL LOCKING FEATURES

CROSS-REFERENCE TO RELATED APPLICATION

This application claims benefit of priority to U.S. Application No. 63/353,959 filed on Jun. 21, 2022, the entire disclosure of which is hereby incorporated by reference.

TECHNICAL FIELD

This disclosure is directed to an electrical connector assembly having flexible and rigid terminal locking features.

BACKGROUND

Connector bodies for electrical connectors used in automotive wiring harnesses have included a terminal lock nib and a flexible cantilever beam located opposite the terminal lock nib that is configured to push a terminal against a wall in the connector and into retaining engagement with the terminal lock nib. An example of such an electrical connector may be found in U.S. Pat. No. 9,071,016. However, as the features of these connector bodies are scaled down to accommodate smaller terminals, several problems are observed. The lock nibs of connector bodies manufactured of unreinforced thermoplastics may be sheared off by forces exerted by the terminal that are less than the terminal retention force required by standards set by automotive manufacturers or organizations such as the United States Council for Automotive Research (USCAR). The lock nibs of connector bodies manufactured from glass fiber reinforced thermoplastics may have sufficient shear strength to meet terminal retention requirements; however, the flexible cantilever beams of these connector bodies are too stiff to provide an acceptable insertion force for inserting the terminal into the terminal cavity. The present invention provides alternatives to and advantages over the prior art.

BRIEF SUMMARY

According to an embodiment, an electrical connector assembly is provided. The electrical connector assembly includes an electrical terminal defining a pair of retaining ridges, a connector housing having a terminal cavity extending therethrough from a first opening to a second opening and a fixed terminal lock nib that projects inwardly into the terminal cavity from a rigid first wall to engage a first ridge of the pair of retaining ridges of the electrical terminal, and a terminal retainer inserted within the connector housing proximate the first opening and removably retained to the connector housing by a flexible retaining arm. The terminal retainer further includes a flexible terminal lock arm having a moveable terminal lock nib that projects inwardly into the terminal cavity from the flexible terminal lock arm to engage a second ridge of the pair of retaining ridges of the electrical terminal, thereby inhibiting removal of the electrical terminal from the terminal cavity through the second opening.

In one or more embodiments of the electrical connector assembly according to the previous paragraph, the terminal retainer partially blocks the first opening, thereby inhibiting removal of the electrical terminal from the terminal cavity through the first opening.

In one or more embodiments of the electrical connector assembly according to any one of the previous paragraphs, the first ridge is arranged opposite the second ridge.

In one or more embodiments of the electrical connector assembly according to any one of the previous paragraphs, the moveable terminal lock nib is arranged opposite the fixed terminal lock nib when the terminal retainer is fully inserted within the connector housing.

In one or more embodiments of the electrical connector assembly according to any one of the previous paragraphs, the retaining arm is a cantilevered arm and the moveable terminal lock nib is arranged proximate a free end of the retaining arm.

In one or more embodiments of the electrical connector assembly according to any one of the previous paragraphs, the assembly further includes a compliant seal surrounding the terminal cavity within the connector housing.

In one or more embodiments of the electrical connector assembly according to any one of the previous paragraphs, the terminal retainer is further configured to retain the seal within the connector housing.

In one or more embodiments of the electrical connector assembly according to any one of the previous paragraphs, the terminal retainer has a generally cylindrical shape.

In one or more embodiments of the electrical connector assembly according to any one of the previous paragraphs, the terminal retainer defines a portal through which a continuity probe may be inserted to verify proper placement of the electrical terminal within the terminal cavity.

According to an embodiment, a method of assembling an electrical connector is provided. The method includes the steps of:

- providing a connector housing having a terminal cavity extending therethrough from a first opening to a second opening and a fixed terminal lock nib that projects inwardly into the terminal cavity from a rigid first wall;
- inserting a terminal retainer within the connector housing and arranging it proximate the first opening, wherein the terminal retainer includes a flexible terminal lock arm having a moveable terminal lock nib that projects inwardly into the terminal cavity from the flexible terminal lock arm;
- removably attaching the terminal retainer to the to the connector housing via a flexible retaining arm;
- inserting an electrical terminal defining a pair of retaining ridges into the terminal cavity though the second opening; and
- engaging a first ridge of the pair of retaining ridges with the fixed terminal lock and engaging a second ridge of the pair of retaining ridges with the moveable terminal lock nib, thereby inhibiting removal of the electrical terminal from the terminal cavity through the second opening.

In one or more embodiments of the method according to the previous paragraph, the steps of the method are performed in the order listed.

In one or more embodiments of the method according to any one of the previous paragraphs, the terminal retainer partially blocks the first opening, thereby inhibiting removal of the electrical terminal from the terminal cavity through the first opening.

In one or more embodiments of the method according to any one of the previous paragraphs, the method further includes the step of:

- inserting a compliant seal within the connector housing such that it surrounds the terminal cavity, wherein this step is performed prior to the step of inserting the terminal retainer within the connector housing.

In one or more embodiments of the method according to any one of the previous paragraphs, the terminal retainer is further configured to retain the seal within the connector housing.

According to an embodiment, an electrical connector assembly is provided. The electrical connector assembly includes an electrical terminal defining a pair of retaining ridges, a connector housing having a terminal cavity extending therethrough from a first opening to a second opening and a fixed terminal lock nib that projects inwardly into the terminal cavity from a rigid first wall configured to engage a first ridge of the pair of retaining ridges and a flexible terminal lock arm having a moveable terminal jock nib that projects inwardly into the terminal cavity from the flexible terminal lock arm and configured to engage a second ridge of the pair of retaining ridges of the electrical terminal, thereby inhibiting removal of the electrical terminal from the terminal cavity through the second opening, and a terminal retainer inserted within the connector housing located proximate the first opening and removably retained to the connector housing by a flexible retaining arm. The terminal retainer further includes a blocking member inserted between the flexible terminal lock arm and the connector housing, thereby inhibiting disengagement of the moveable terminal lock nib from the second ridge.

In one or more embodiments of the electrical connector assembly according to the previous paragraph, the terminal retainer partially blocks the first opening, thereby inhibiting removal of the electrical terminal from the terminal cavity through the first opening.

In one or more embodiments of the electrical connector assembly according to any one of the previous paragraphs, the terminal retainer defines a portal configured to receive a tool to disengage the moveable terminal lock nib from the second ridge.

DESCRIPTION OF THE DRAWINGS

The present invention will now be described by way of example with reference to the accompanying drawings, in which.

DETAILED DESCIRPTION

Figure 1:
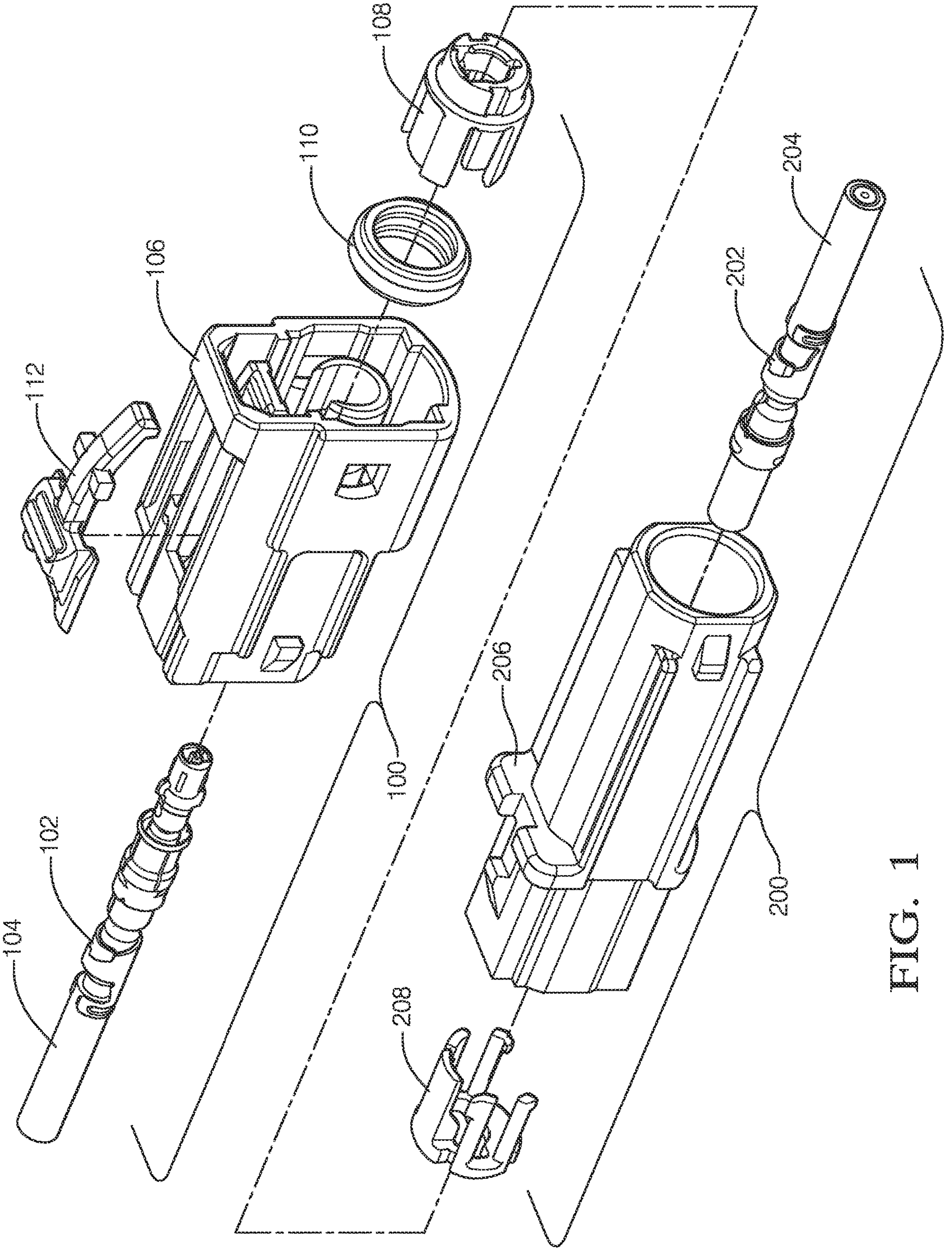
FIG. 1 illustrates an exploded view of an electrical connector assembly according to some embodiments.
Figure 2:
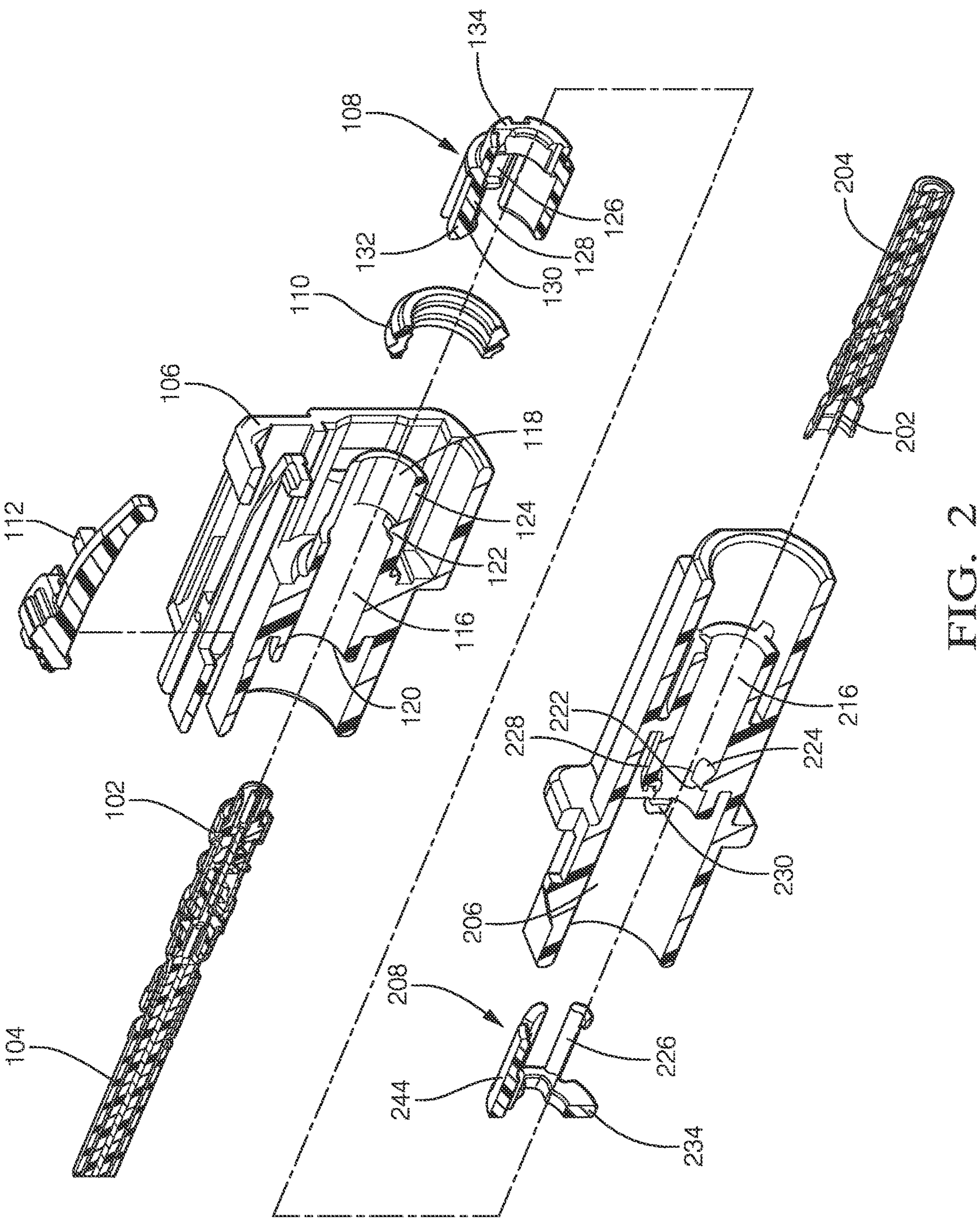
FIG. 2 illustrates a cross section of the exploded view of the electrical connector assembly of FIG. 1 according to some embodiments.
Figure 3:
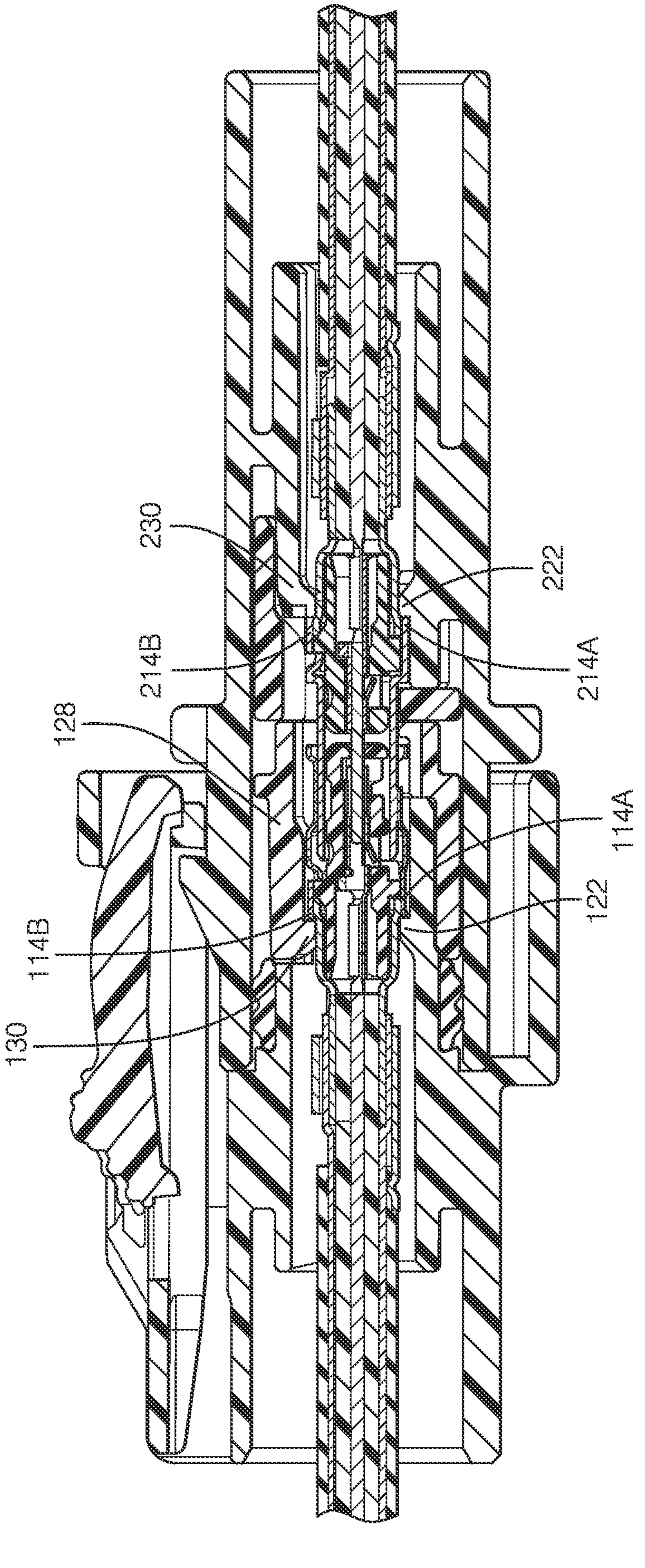
FIG. 3 illustrates a cross section side view of the electrical connector assembly of FIG. 1 according to some embodiments.
Figure 4:
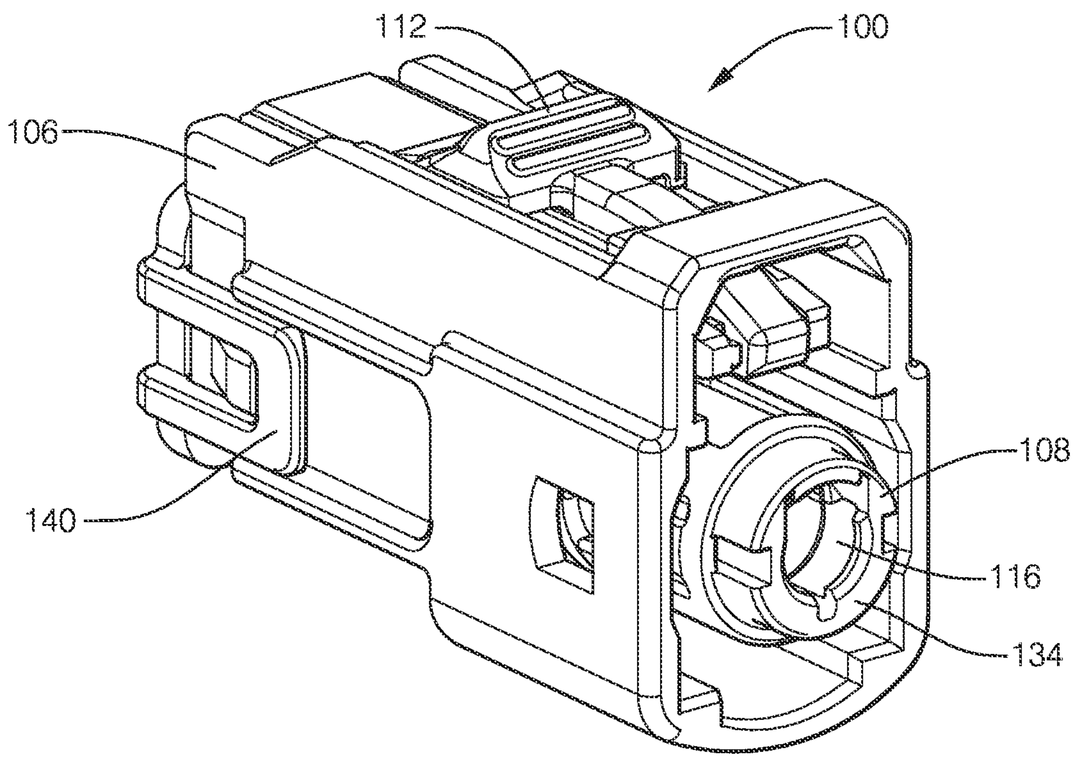
FIG. 4 illustrates a perspective view of a female connector subassembly of the electrical connector assembly of FIG. 1 according to some embodiments.

FIGS. 1 and 2 show an electrical connector assembly, e.g., a miniature coaxial connector assembly as may be used in an automotive application. The connector assembly includes a female connector assembly 100 and a male connector assembly 200. The female connector assembly 100 includes a shielded terminal 102 attached to a coaxial cable 104 that is secured within a female connector housing 106. The male connector assembly 200 includes a mating shielded terminal 202 attached to another coaxial cable 204 that is secured within a male connector housing 206. The female and male connector assemblies 100, 200 also each include a terminal retainer 108, 208 that are configured to retainer the shielded terminals 102, 202 within the connector housings 106, 206. The female connector assembly 100 also includes a compliant connector seal 110 that seals the interface between the connector housings 106, 206. The female connector assembly 100 further includes a connector position assurance (CPA) device 112 that is configured to maintain engagement of the female connector assembly 100 with the male connector assembly 200 after they are properly mated as shown in FIG. 3.

The shielded terminal 102 defines a pair of retaining ridges 114A, 114B. The connector housing 106 has a terminal cavity 116 extending therethrough from a first opening 118 to a second opening 120. A fixed terminal lock nib 122 projects inwardly into the terminal cavity 116 from a rigid first wall 124 of the connector housing 106 to engage a first ridge 114A of the pair of retaining ridges of the shielded terminal 102.

A terminal retainer 108 is inserted within the connector housing 106 in a location that is proximate the first opening 118. The terminal retainer 108 is removably retained to the connector housing 106 by a pair of flexible retaining alms 126. As used herein "removably retained" means that the terminal retainer 108 can be attached to the connector housing 106, detached from the connector housing 106, and then attached to the connector housing 106. The terminal retainer 108 has a generally cylindrical shape. The terminal retainer 108 further includes a flexible terminal lock arm 128 having a moveable terminal lock nib 130 that projects inwardly into the terminal cavity 116 from the flexible terminal lock arm 128 to engage a second ridge 114B of the pair of retaining ridges of the shielded terminal 102, thereby inhibiting removal of the shielded terminal 102 from the terminal cavity 116 through the second opening 120. The terminal lock arm 128 is a cantilevered arm. The moveable terminal lock nib 130 is arranged proximate a free end 132 of the terminal lock arm 128.

The terminal retainer 108 includes a wall 134 that partially blocks the first opening 118. The wall 134 inhibits removal of the shielded terminal 102 from the terminal cavity 116 through the first opening 118. The first ridge 114A is arranged on the shielded terminal 102 generally opposite the second ridge 114B. The moveable terminal lock nib 130 is arranged opposite the fixed terminal lock nib 122 when the terminal retainer 108 is fully inserted within the connector housing 106.

Figure 5:
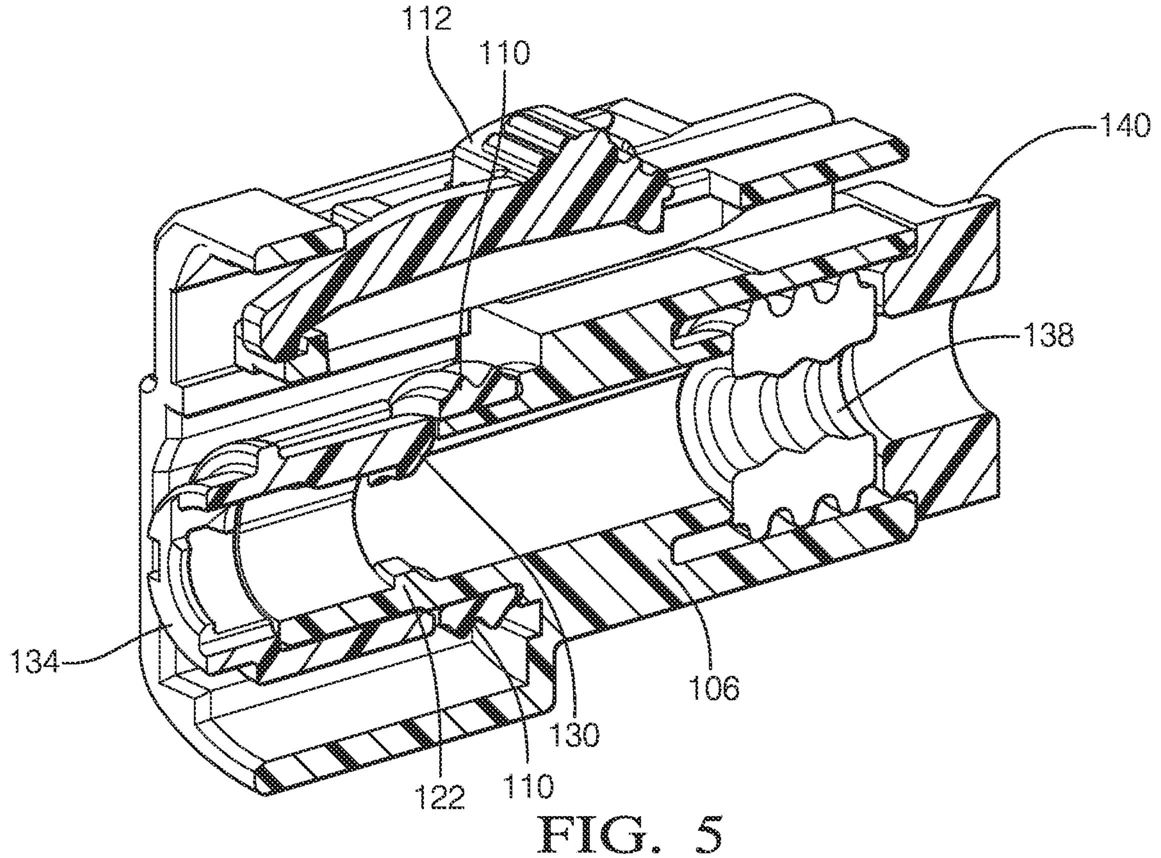
FIG. 5 illustrates a cross section perspective view of the female connector subassembly of FIG. 4 according to some embodiments.
Figure 6:
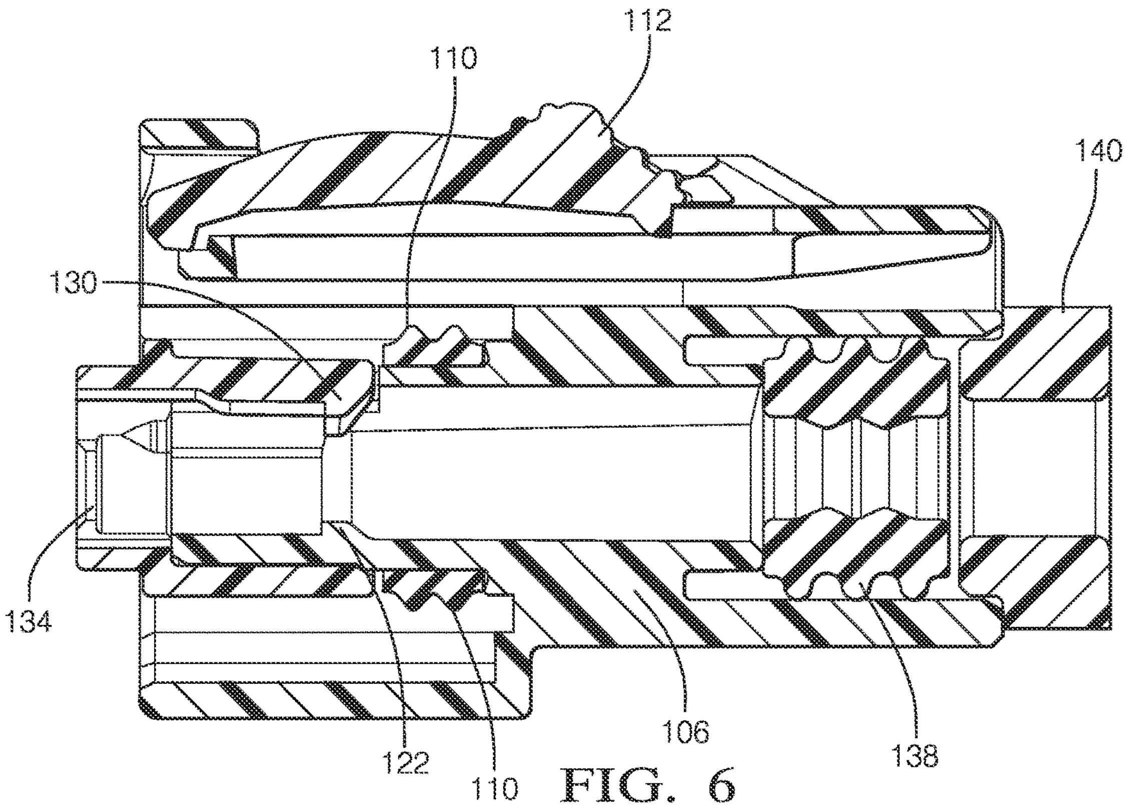
FIG. 6 illustrates a cross section side view of the female connector subassembly of FIG. 4 according to some embodiments.
Figure 7:
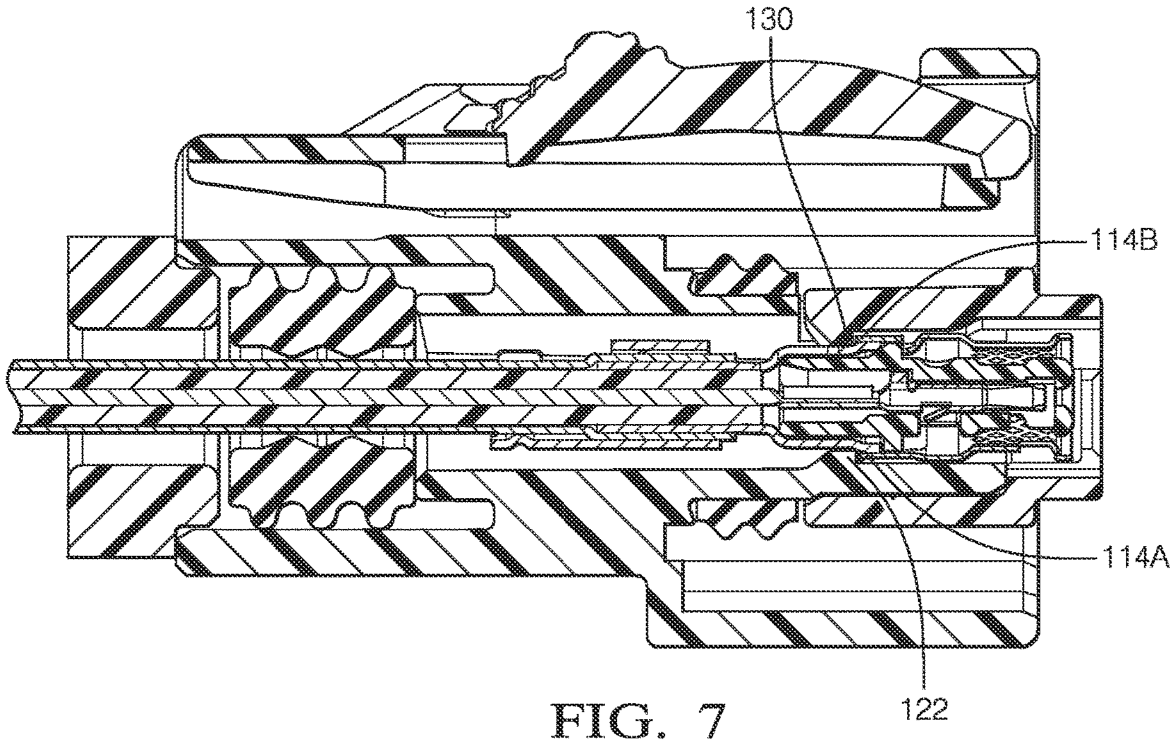
FIG. 7 illustrates a cross section side view of a female connector assembly of the electrical connector assembly of FIG. 1 according to some embodiments.

The connector seal 110 surrounds the terminal cavity 116 within the connector housing 106. The connector seal 110 is configured to seal the interface between the female connector assembly 100 and the male connector assembly 200 and inhibit the ingress of environmental contaminants, such as water or dust, into the terminal cavity 116 that may degrade the connection between the shielded terminals 102, 202. The terminal retainer 108 is further configured to retain the connector seal 110 within the connector housing 106. As shown in FIGS. 5 to 7, the female connector assembly 100 may also include a cable seal 138 and cable seal retainer 140 that is configured to seal the coaxial cable 104 to the connector housing 106 and inhibit the ingress of environmental contaminants into the terminal cavity 116.

Figure 8B:
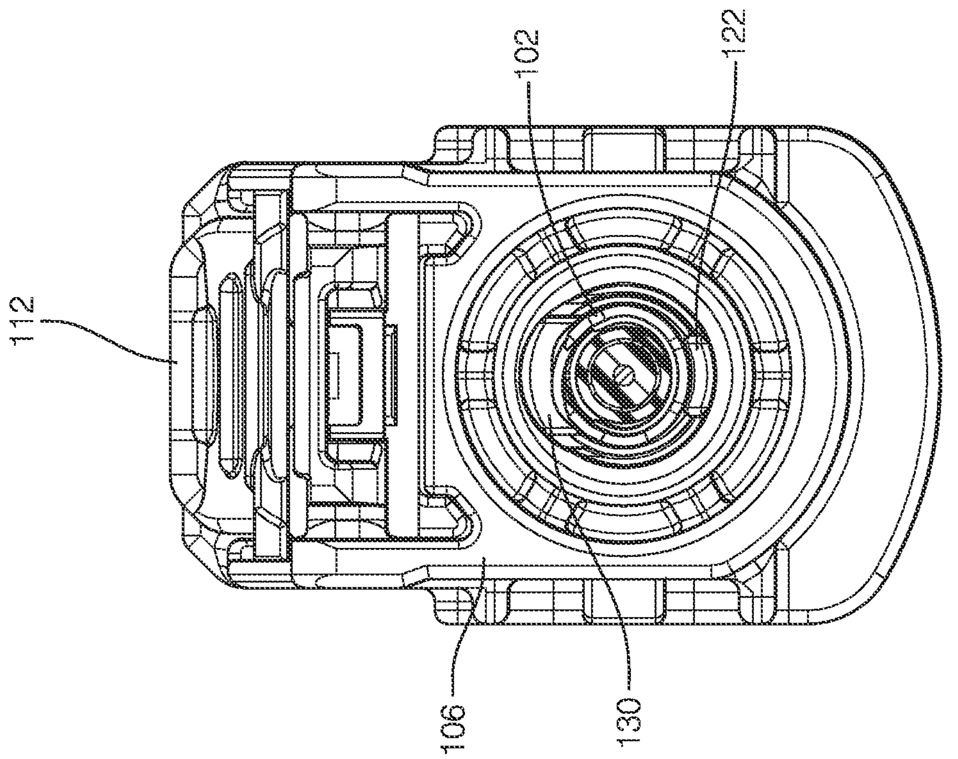
FIG. 8B illustrates a rear view of the female connector assembly of FIG. 7 according to some embodiments.
Figure 8A:
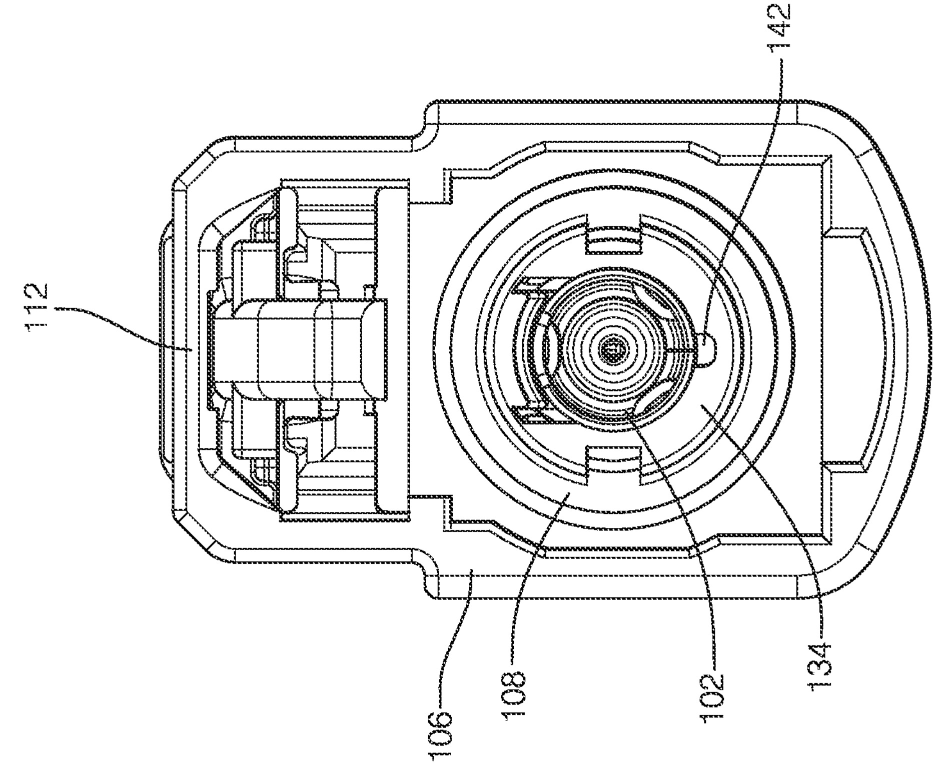
FIG. 8A illustrates a front view of the female connector assembly of FIG. 7 according to some embodiments.

The terminal retainer 108 defines a portal 142, shown in FIG. 8A, through which a continuity probe (not shown) may be inserted to verify proper placement of the shielded terminal 102 within the terminal cavity 116.

Figure 10:
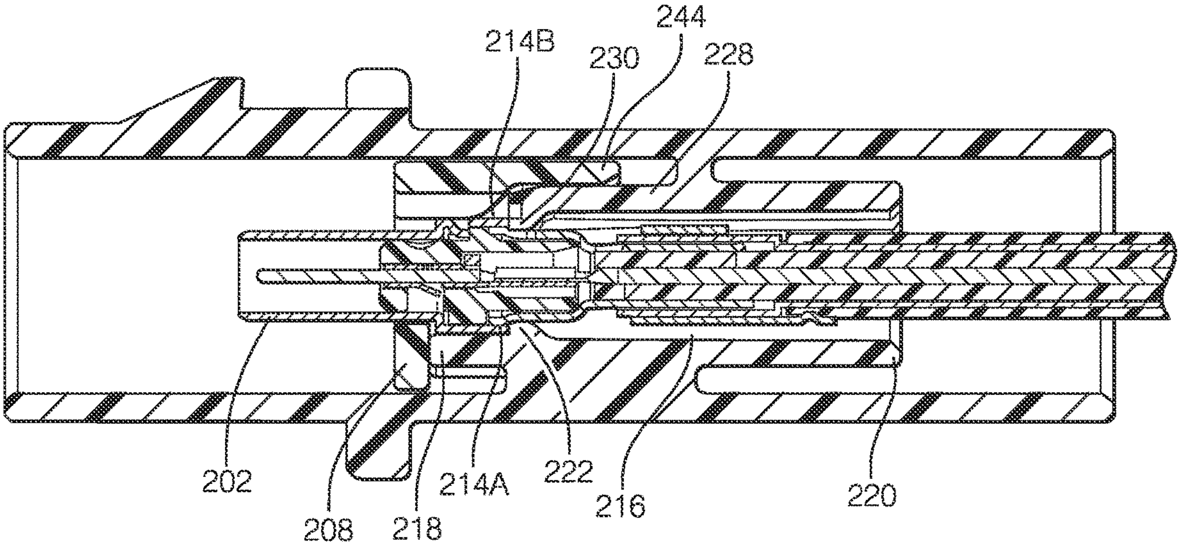
FIG. 10 illustrates a cross section side view of the male connector assembly of FIG. 9A according to some embodiments.
Figure 11:
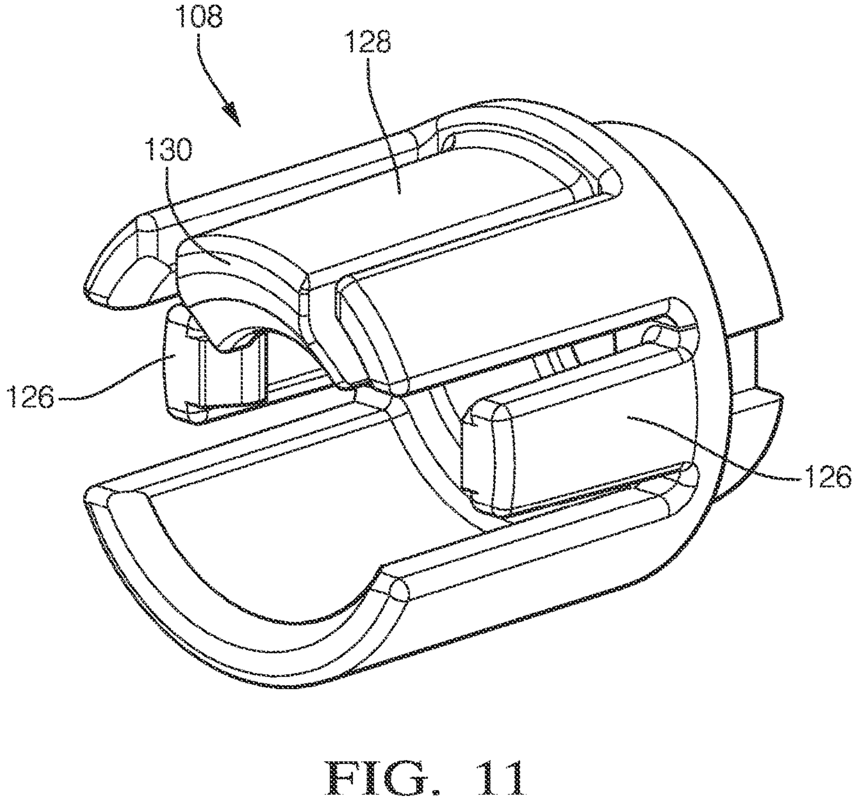
FIG. 11 illustrates a perspective view of a terminal retainer of the female connector assembly of FIG. 7 according to some embodiments.

As shown in FIG. 10, the shielded terminal 202 of the male connector assembly 200 defines a pair of retaining ridges 214A, 214B. The connector housing 206 defines a terminal cavity 216 extending from a first opening 218 to a second opening 220 and a fixed terminal lock nib 222 that projects inwardly into the terminal cavity 216 from a rigid first wall 224 to engage a first ridge 214A of the pair of retaining ridges of the shielded terminal 202. The connector housing 206 also defines a flexible terminal lock arm 228 having a moveable terminal lock nib 230 that projects inwardly into the terminal cavity 216 from the flexible terminal lock arm 228 to engage a second ridge 214B of the pair of retaining ridges of the shielded terminal 202. The moveable terminal lock nib 230 inhibits removal of the shielded terminal 202 from the terminal cavity 216 through the second opening 220.

The male connector assembly 200 also includes a terminal retainer 208 that is inserted within the connector housing 206 in a location that is proximate the first opening 218 and removably retained to the connector housing 206 by a pair of flexible retaining arms 226. The terminal retainer 208 includes a wall 234 that partially blocks the first opening 218. The wall 234 inhibits removal of the shielded terminal 202 from the terminal cavity 216 through the first opening 218. The first ridge 214A is arranged on the shielded terminal 202 opposite the second ridge 214B. The moveable terminal lock nib 230 is arranged opposite the fixed terminal lock nib 222. The terminal retainer 208 further includes a blocking member 244 extending generally perpendicular from the wall 234. The blocking member 244 is inserted between the flexible terminal lock arm 228 and the connector housing 206 and inhibits disengagement of the moveable terminal lock nib 230 from the second ridge 214B. The terminal retainer 208 is configured to be movable to a position where the blocking member 244 is not inserted between the flexible terminal lock arm 228 and the connector housing 206 while the terminal retainer 208 is still attached to the connector housing 206.

Figure 9B:
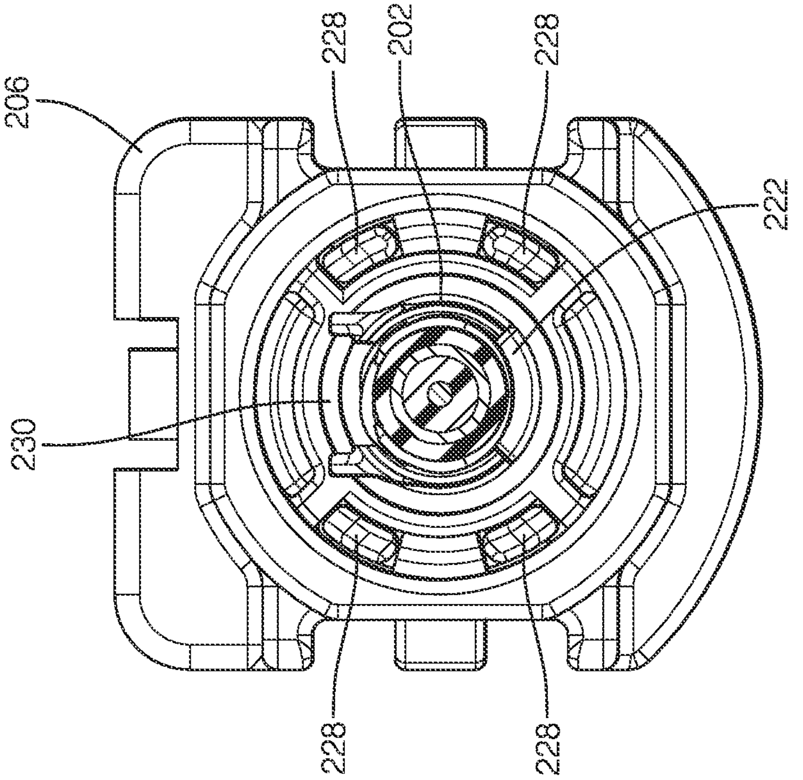
FIG. 9B illustrates a rear view of the male connector assembly of FIG. 9A according to some embodiments.
Figure 9A:
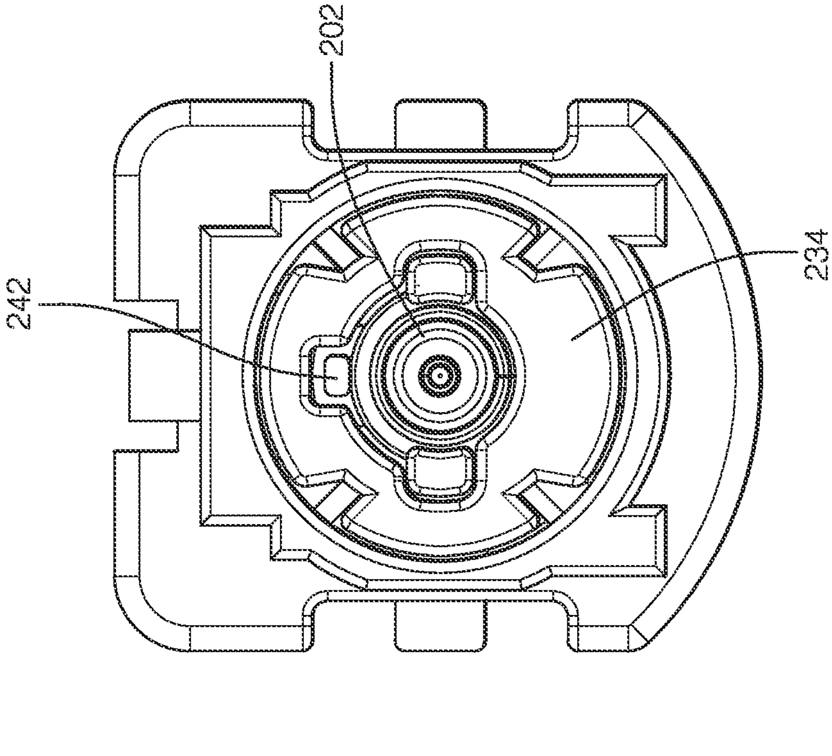
FIG. 9A illustrates a front view of a male connector assembly of the electrical connector assembly of FIG. 1 according to some embodiments.
Figure 12:
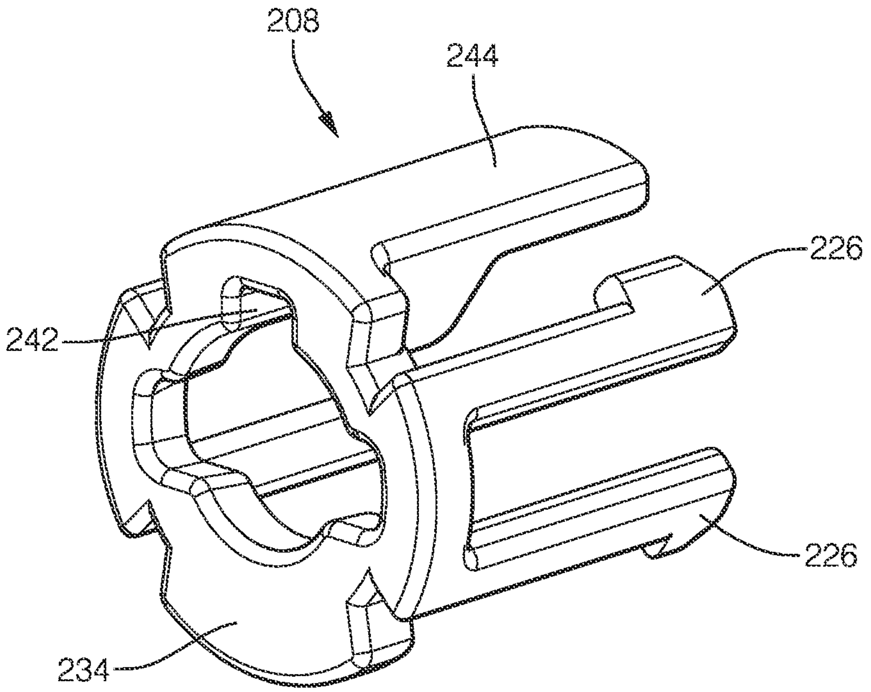
FIG. 12 illustrates a perspective view of a terminal retainer of the male connector assembly of FIG. 9A according to some embodiments.
Figure 13:
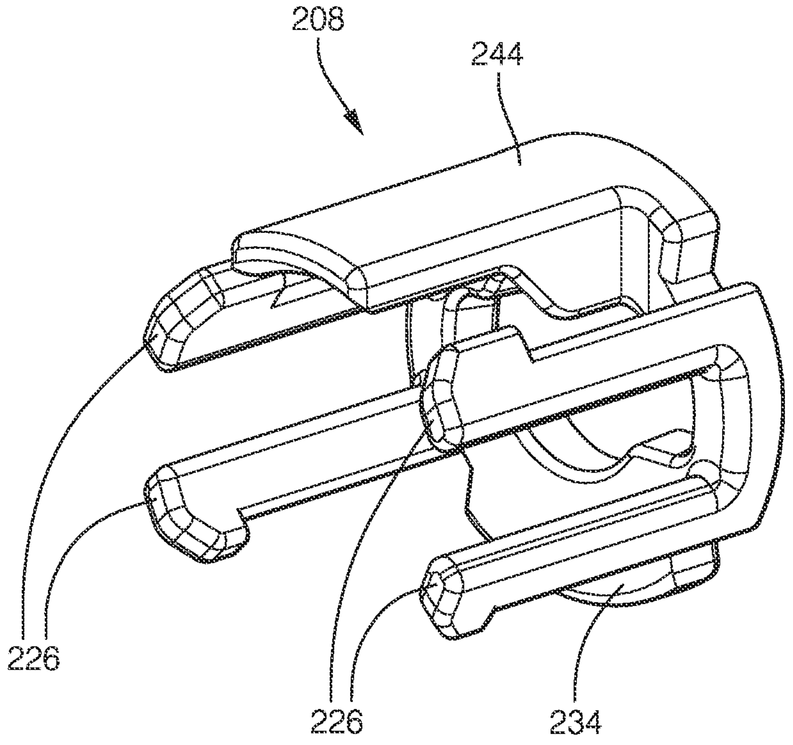
FIG. 13 illustrates an alternative perspective view of the terminal retainer of FIG. 12 according to some embodiments.

As shown in FIGS. 9A and 12, the terminal retainer 208 defines a portal 242 through which a tool (not shown) may be inserted to pry the flexible terminal lock arm 228 to disengage the moveable terminal lock nib 230 from the second ridge 214B.

Figure 14:
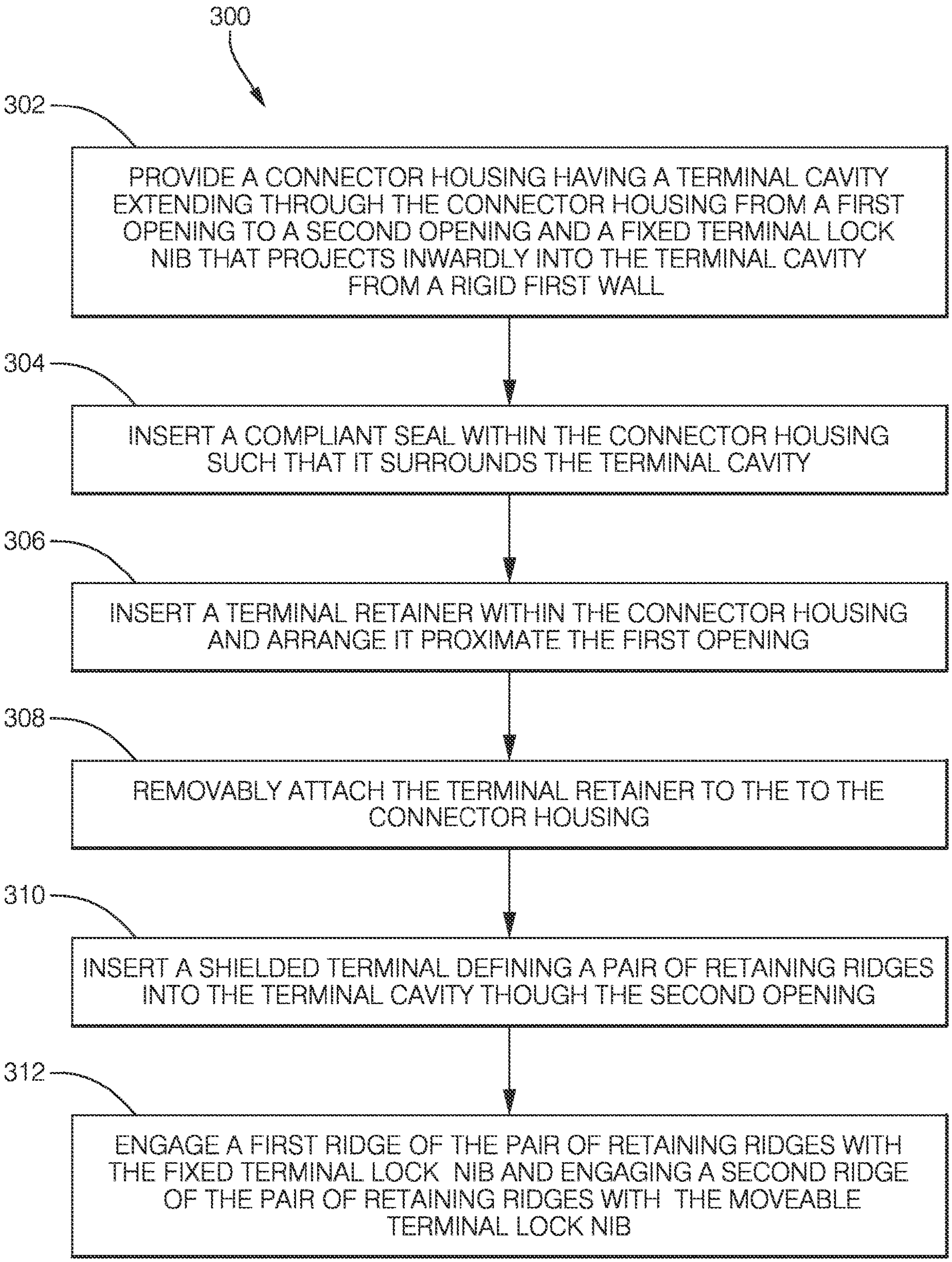
FIG. 14 illustrates a method of assembling an electrical connector according to some embodiments.

FIG. 14 illustrates a method 300 of assembling the female connector assembly 100 that includes at least the steps of:

STEP 302, providing the connector housing 106 having the terminal cavity 116 extending through the connector housing 106 from a first opening 118 to a second opening 120 and a fixed terminal lock nib 122 that projects inwardly into the terminal cavity 116 from a rigid first wall 124;

STEP 306, inserting a terminal retainer 108 within the connector housing 106 and arranging it proximate the first opening 118. The terminal retainer 108 includes a flexible terminal lock arm 128 having a moveable terminal lock nib 130 that projects inwardly into the terminal cavity 116 from the flexible terminal lock arm 128;

STEP 308, removably attaching the terminal retainer 108 to the to the connector housing 106 via a pair of flexible retaining arms 126;

STEP 310, inserting a shielded terminal 102 defining a pair of retaining ridges 114A, 114B into the terminal cavity 116 though the second opening 120; and STEP 312, engaging a first ridge 114A of the pair of retaining ridges with the fixed terminal lock nib 122 and engaging a second ridge 114B of the pair of retaining ridges with the moveable terminal lock nib 130, thereby inhibiting removal of the shielded terminal 102 from the terminal cavity 116 through the second opening 120.

The steps of the method are preferably performed in the order listed above.

A method 300 may also include the step of:

STEP 304, inserting a compliant seal 110 within the connector housing 106 such that it surrounds the terminal cavity 116.

This step of the method 300 is preferably performed prior to the step of inserting the terminal retainer 108 within the connector housing 106.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment (s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector assembly, comprising:
- an electrical terminal defining a pair of retaining ridges;
- a connector housing having a terminal cavity extending therethrough from a first opening to a second opening and a fixed terminal lock nib that projects inwardly into the terminal cavity from a rigid first wall to engage a first ridge of the pair of retaining ridges of the electrical terminal; and
- a terminal retainer inserted within the connector housing proximate the first opening and removably retained to the connector housing by a flexible retaining arm, wherein the terminal retainer further includes a flexible terminal lock arm having a moveable terminal lock nib that projects inwardly into the terminal cavity from the flexible terminal lock arm to engage a second ridge of the pair of retaining ridges of the electrical terminal, thereby inhibiting removal of the electrical terminal from the terminal cavity through the second opening.

2. The electrical connector assembly in accordance with claim 1, wherein the terminal retainer partially blocks the first opening, thereby inhibiting removal of the electrical terminal from the terminal cavity through the first opening.

3. The electrical connector assembly in accordance with claim 1, wherein the first ridge is arranged opposite the second ridge.

4. The electrical connector assembly in accordance with claim 3, wherein the moveable terminal lock nib is arranged opposite the fixed terminal lock nib when the terminal retainer is fully inserted within the connector housing.

5. The electrical connector assembly in accordance with claim 1, wherein the retaining arm is a cantilevered arm and wherein the moveable terminal lock nib is arranged proximate a free end of the retaining arm.

6. The electrical connector assembly in accordance with claim 1, further comprising a compliant seal surrounding the terminal cavity within the connector housing.

7. The electrical connector assembly in accordance with claim 6, wherein the terminal retainer is further configured to retain the seal within the connector housing.

8. The electrical connector assembly in accordance with claim 1, wherein the terminal retainer has a generally cylindrical shape.

9. The electrical connector assembly in accordance with claim 1, wherein the terminal retainer defines a portal through which a continuity probe may be inserted to verify proper placement of the electrical terminal within the terminal cavity.

10. A method of assembling an electrical connector, comprising:
- providing a connector housing having a terminal cavity extending therethrough from a first opening to a second opening and a fixed terminal lock nib that projects inwardly into the terminal cavity from a rigid first wall;
- inserting a terminal retainer within the connector housing and arranging it proximate the first opening, wherein the terminal retainer includes a flexible terminal lock arm having a moveable terminal lock nib that projects inwardly into the terminal cavity from the flexible terminal lock arm;
- removably attaching the terminal retainer to the connector housing via a flexible retaining arm;
- inserting an electrical terminal defining a pair of retaining ridges into the terminal cavity though the second opening; and
- engaging a first ridge of the pair of retaining ridges with the fixed terminal lock and engaging a second ridge of the pair of retaining ridges with the moveable terminal lock nib, thereby inhibiting removal of the electrical terminal from the terminal cavity through the second opening.

11. The method in accordance with claim 10, wherein the steps of the method are performed in the order listed.

12. The method in accordance with claim 10, wherein the terminal retainer partially blocks the first opening, thereby inhibiting removal of the electrical terminal from the terminal cavity through the first opening.

13. The method in accordance with claim 10, further comprising:
- inserting a compliant seal within the connector housing such that it surrounds the terminal cavity, wherein this step is performed prior to the step of inserting the terminal retainer within the connector housing.

14. The method in accordance with claim 13, wherein the terminal retainer is further configured to retain the seal within the connector housing.

15. An electrical connector assembly, comprising:
- an electrical terminal defining a pair of retaining ridges;
- a connector housing having a terminal cavity extending therethrough from a first opening to a second opening and a fixed terminal lock nib that projects inwardly into the terminal cavity from a rigid first wall configured to engage a first ridge of the pair of retaining ridges and a flexible terminal lock arm having a moveable terminal lock nib that projects inwardly into the terminal cavity from the flexible terminal lock arm and configured to engage a second ridge of the pair of retaining ridges of the electrical terminal, thereby inhibiting removal of the electrical terminal from the terminal cavity through the second opening; and a terminal retainer inserted within the connector housing located proximate the first opening and removably retained to the connector housing by a flexible retaining arm, wherein the terminal retainer further includes a blocking member inserted between the flexible terminal lock arm and the connector housing, thereby inhibiting disengagement of the moveable terminal lock nib from the second ridge.

16. The electrical connector assembly in accordance with claim 15, wherein the terminal retainer partially blocks the first opening, thereby inhibiting removal of the electrical terminal from the terminal cavity through the first opening.

17. The electrical connector assembly in accordance with claim 15, wherein the terminal retainer defines a portal configured to receive a tool to disengage the moveable terminal lock nib from the second ridge.

* * * * *